(12) United States Patent
Steinhagen

(10) Patent No.: US 10,698,265 B1
(45) Date of Patent: Jun. 30, 2020

(54) QUANTUM DOT FILM

(71) Applicant: E Ink California, LLC, Fremont, CA (US)

(72) Inventor: Chet Steinhagen, San Jose, CA (US)

(73) Assignee: E Ink California, LLC, Fremont, CA (US)

( * ) Notice: Subject to any disclaimer, the term of this patent is extended or adjusted under 35 U.S.C. 154(b) by 140 days.

(21) Appl. No.: 16/046,005

(22) Filed: Jul. 26, 2018

Related U.S. Application Data

(60) Provisional application No. 62/568,909, filed on Oct. 6, 2017.

(51) Int. Cl.
| | |
|---|---|
| *G02F 1/167* | (2019.01) |
| *G02F 1/13357* | (2006.01) |
| *G02F 1/157* | (2006.01) |
| *G02F 1/1335* | (2006.01) |
| *B32B 3/12* | (2006.01) |
| *C09K 11/02* | (2006.01) |
| *C09K 11/08* | (2006.01) |
| *B32B 27/08* | (2006.01) |
| *B82Y 20/00* | (2011.01) |
| *B82Y 40/00* | (2011.01) |

(52) U.S. Cl.
CPC .......... *G02F 1/133617* (2013.01); *B32B 3/12* (2013.01); *B32B 27/08* (2013.01); *C09K 11/025* (2013.01); *C09K 11/08* (2013.01); *G02F 1/133514* (2013.01); *G02F 1/157* (2013.01); *G02F 1/167* (2013.01); *B32B 2457/202* (2013.01); *B82Y 20/00* (2013.01); *B82Y 40/00* (2013.01)

(58) Field of Classification Search
CPC ... G02F 1/01; G02F 1/167; G02F 1/19; E06B 9/24; E06B 2009/2464
USPC .......................................................... 359/238
See application file for complete search history.

(56) References Cited

U.S. PATENT DOCUMENTS

| | | |
|---|---|---|
| 6,241,921 B1 | 6/2001 | Jacobson |
| 6,545,797 B2 | 4/2003 | Chen |
| 6,672,921 B1 | 1/2004 | Liang |
| 6,751,007 B2 | 6/2004 | Liang |
| 6,751,008 B2 | 6/2004 | Liang |
| 6,753,067 B2 | 6/2004 | Chen |
| 6,781,745 B2 | 8/2004 | Chung |
| 6,788,449 B2 | 9/2004 | Liang |
| 6,788,452 B2 | 9/2004 | Liang |
| 6,795,229 B2 | 9/2004 | Liang |
| 6,806,995 B2 | 10/2004 | Chung |
| 6,825,829 B1 | 11/2004 | Albert |
| 6,829,078 B2 | 12/2004 | Liang |
| 6,831,770 B2 | 12/2004 | Liang |
| 6,833,177 B2 | 12/2004 | Chen |
| 6,833,943 B2 | 12/2004 | Liang |
| 6,850,355 B2 | 2/2005 | Liang |

(Continued)

*Primary Examiner* — Mohammed A Hasan
(74) *Attorney, Agent, or Firm* — William John Keyes

(57) ABSTRACT

A quantum dot film includes a plurality of sealed microcells. The microcells may be formed within a layer of polymeric material and sealed with a sealing material. Also, the microcells may contain a dispersion of a solvent and a plurality of quantum dots. A method of making a quantum dot film includes providing a layer of polymeric material having a plurality of open microcells, filling the plurality of open microcells with a dispersion of a solvent and plurality of quantum dots, and sealing the microcells.

24 Claims, 2 Drawing Sheets

(56) References Cited

U.S. PATENT DOCUMENTS

| | | |
|---|---|---|
| 6,859,302 B2 | 2/2005 | Liang |
| 6,865,012 B2 | 3/2005 | Liang |
| 6,867,898 B2 | 3/2005 | Liang |
| 6,870,662 B2 | 3/2005 | Tseng |
| 6,885,495 B2 | 4/2005 | Liang |
| 6,906,779 B2 | 6/2005 | Chan-Park |
| 6,914,714 B2 | 7/2005 | Chen |
| 6,922,276 B2 | 7/2005 | Zhang |
| 6,930,818 B1 | 8/2005 | Liang |
| 6,933,098 B2 | 8/2005 | Chan-Park |
| 6,947,202 B2 | 9/2005 | Liang |
| 6,972,893 B2 | 12/2005 | Chen |
| 6,982,178 B2 | 1/2006 | LeCain et al. |
| 6,987,605 B2 | 1/2006 | Liang |
| 7,002,728 B2 | 2/2006 | Pullen |
| 7,005,468 B2 | 2/2006 | Zang |
| 7,012,600 B2 | 3/2006 | Zehner |
| 7,046,228 B2 | 5/2006 | Liang |
| 7,052,571 B2 | 5/2006 | Wang |
| 7,072,095 B2 | 7/2006 | Liang |
| 7,075,502 B1 | 7/2006 | Drzaic |
| 7,079,303 B2 | 7/2006 | Hou |
| 7,112,114 B2 | 9/2006 | Liang |
| 7,116,318 B2 | 10/2006 | Amundson |
| 7,141,279 B2 | 11/2006 | Liang |
| 7,144,942 B2 | 12/2006 | Zang |
| 7,156,945 B2 | 1/2007 | Chaug |
| 7,158,282 B2 | 1/2007 | Liang |
| 7,166,182 B2 | 1/2007 | Pereira |
| 7,205,355 B2 | 4/2007 | Liang |
| 7,233,429 B2 | 6/2007 | Liang |
| 7,236,292 B2 | 6/2007 | LeCain |
| 7,261,920 B2 | 8/2007 | Haubrich |
| 7,271,947 B2 | 9/2007 | Liang |
| 7,304,780 B2 | 12/2007 | Liu |
| 7,307,778 B2 | 12/2007 | Wang |
| 7,312,784 B2 | 12/2007 | Baucom |
| 7,327,346 B2 | 2/2008 | Chung |
| 7,339,715 B2 | 3/2008 | Webber |
| 7,347,957 B2 | 3/2008 | Wu |
| 7,374,634 B2 | 5/2008 | Wang |
| 7,385,751 B2 | 6/2008 | Chen |
| 7,408,696 B2 | 8/2008 | Liang |
| 7,411,719 B2 | 8/2008 | Paolini, Jr. |
| 7,443,571 B2 | 10/2008 | LeCain et al. |
| 7,453,445 B2 | 11/2008 | Amundson |
| 7,470,386 B2 | 12/2008 | Kang |
| 7,504,050 B2 | 3/2009 | Weng |
| 7,513,813 B2 | 4/2009 | Paolini, Jr. et al. |
| 7,522,332 B2 | 4/2009 | Liang |
| 7,535,624 B2 | 5/2009 | Amundson et al. |
| 7,557,981 B2 | 7/2009 | Liang |
| 7,560,004 B2 | 7/2009 | Pereira |
| 7,561,324 B2 | 7/2009 | Duthaler et al. |
| 7,564,614 B2 | 7/2009 | Chen |
| 7,572,491 B2 | 8/2009 | Wang |
| 7,580,180 B2 | 8/2009 | Ho |
| 7,616,374 B2 | 11/2009 | Chen |
| 7,636,191 B2 | 12/2009 | Duthaler |
| 7,649,666 B2 | 1/2010 | Isobe et al. |
| 7,679,814 B2 | 3/2010 | Paolini, Jr. |
| 7,684,108 B2 | 3/2010 | Wang |
| 7,715,087 B2 | 5/2010 | Hou |
| 7,715,088 B2 | 5/2010 | Liang |
| 7,728,811 B2 | 6/2010 | Albert et al. |
| 7,729,039 B2 | 6/2010 | LeCain et al. |
| 7,767,126 B2 | 8/2010 | Kang |
| 7,791,782 B2 | 9/2010 | Paolini, Jr. |
| 7,826,129 B2 | 11/2010 | Wu |
| 7,839,564 B2 | 11/2010 | Whitesides et al. |
| 7,843,621 B2 | 11/2010 | Danner et al. |
| 7,843,624 B2 | 11/2010 | Danner |
| 7,880,958 B2 | 2/2011 | Zang |
| 8,002,948 B2 | 8/2011 | Haubrich |
| 8,009,348 B2 | 8/2011 | Zehner |
| 8,034,209 B2 | 10/2011 | Danner |
| 8,068,272 B2 | 11/2011 | LeCain et al. |
| 8,077,381 B2 | 12/2011 | LeCain et al. |
| 8,154,790 B2 | 4/2012 | Wang |
| 8,169,690 B2 | 5/2012 | Lin |
| 8,177,942 B2 | 5/2012 | Paolini, Jr. |
| 8,179,589 B2 | 5/2012 | Wu |
| 8,361,356 B2 | 1/2013 | Zang |
| 8,390,301 B2 | 3/2013 | Danner |
| 8,441,432 B2 | 5/2013 | Zang |
| 8,482,835 B2 | 7/2013 | LeCain |
| 8,520,292 B2 | 8/2013 | Liang |
| 8,582,197 B2 | 11/2013 | Liang |
| 8,625,188 B2 | 1/2014 | Wang |
| 8,786,929 B2 | 7/2014 | LeCain |
| 8,830,553 B2 | 9/2014 | Patry |
| 8,830,561 B2 | 9/2014 | Zang |
| 8,854,721 B2 | 10/2014 | Danner |
| 8,891,156 B2 | 11/2014 | Yang |
| 9,075,280 B2 | 7/2015 | Whitesides |
| 9,081,250 B2 | 7/2015 | Liang |
| 9,238,340 B2 | 1/2016 | Kayal |
| 9,279,906 B2 | 3/2016 | Kang |
| 9,291,872 B1 | 3/2016 | Lin |
| 9,346,987 B2 | 5/2016 | Wang |
| 9,388,307 B2 | 7/2016 | Li |
| 9,436,057 B2 | 9/2016 | Kang |
| 9,436,058 B2 | 9/2016 | Li |
| 9,470,917 B2 | 10/2016 | Lin |
| 9,554,495 B2 | 1/2017 | Danner |
| 9,733,540 B2 | 8/2017 | LeCain et al. |
| 9,759,978 B2 | 9/2017 | Liu |
| 2002/0188053 A1 | 12/2002 | Zang |
| 2003/0175480 A1 | 9/2003 | Chen |
| 2003/0175481 A1 | 9/2003 | Liang |
| 2003/0179437 A1 | 9/2003 | Liang |
| 2003/0203101 A1 | 10/2003 | Haubrich |
| 2004/0120024 A1 | 6/2004 | Chen |
| 2004/0219306 A1 | 11/2004 | Wang |
| 2007/0237962 A1 | 10/2007 | Liang |
| 2009/0168067 A1 | 7/2009 | LeCain et al. |
| 2011/0164301 A1 | 7/2011 | Paolini, Jr. |
| 2014/0050814 A1 | 2/2014 | Kang |
| 2015/0005720 A1 | 1/2015 | Zang |
| 2015/0098124 A1 | 4/2015 | Li |
| 2015/0277160 A1 | 10/2015 | Laxton |
| 2015/0368553 A1 | 12/2015 | Nelson |
| 2016/0012710 A1 | 1/2016 | Lu |
| 2016/0059442 A1 | 3/2016 | Kang |
| 2016/0059617 A1 | 3/2016 | Kang |
| 2017/0097555 A1* | 4/2017 | Lattes ................ G02F 1/13318 |
| 2017/0205649 A1* | 7/2017 | Wang ...................... C09D 7/63 |
| 2019/0278149 A1* | 9/2019 | Crounse ................ G02F 1/167 |

* cited by examiner

QUANTUM DOT FILM

CROSS-REFERENCE TO RELATED APPLICATIONS

This application is related to and claims priority of U.S. Provisional Application 62/568,909 filed on Oct. 6, 2017. The entire disclosure of the aforementioned application is herein incorporated by reference.

FIELD OF THE INVENTION

This invention relates to quantum dot films. More specifically, in one aspect this invention relates to display systems comprising quantum dot films. In another aspect, this invention relates to a method of making quantum dot films.

BACKGROUND

Quantum dots are particles made from nanomaterials that emit light of specific frequencies upon the application of an electrical current or light. The frequencies of the light emitted by the quantum dots may be varied by changing the dots' size, shape, and type of material. One application of quantum dots are electro-optic displays, specifically, LED displays, because of the potential for improved color accuracy.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or in the case of displays intended for machine reading, pseudo-color in the sense of a change in reflectance of electromagnetic wavelengths outside the visible range.

Quantum dots are commonly incorporated into an LED display by being provided in the form of a film that is laminated between a back-light unit and a red-green-blue (RGB) color filter. The back-light unit comprises a blue LED and a portion of the emitted blue light is converted into red and green light after passing through the quantum dot film. Therefore, the light exiting the quantum dot film and entering the color filter includes a substantially increased portion of red, green, or blue light. As a result, the amount of light that is absorbed by the color filter is reduced.

Quantum dot films are manufactured by blending quantum dots in a polymer, such as an epoxy, and applying a barrier layer on either side of the layer of polymer-quantum dot blend. The cured polymer and barrier layers seal the quantum dots from oxygen and water, which may degrade the material over time. However, there are frequently difficulties inherent in mixing quantum dots and polymers, such as homogeneity, dispersibility, and performance loss (quantum yield and reliability). Thus, there is a need for improved quantum dot films.

SUMMARY

According to a first embodiment of the present invention, a quantum dot film may comprise a plurality of sealed microcells. The microcells may be formed within a layer of polymeric material and sealed with a sealing material. Also, the microcells may contain a dispersion comprising a solvent and a plurality of quantum dots.

According to a second embodiment of the present invention, a method of making a quantum dot film may comprise providing a layer of polymeric material having a plurality of open microcells, filling the plurality of open microcells with a dispersion comprising a solvent and a plurality of quantum dots, and sealing the microcells.

These and other aspects of the present invention will be apparent in view of the following description.

BRIEF DESCRIPTION OF THE FIGURES

The drawing Figures depict one or more implementations in accord with the present concepts, by way of example only, not by way of limitations. In the figures, like reference numerals refer to the same or similar elements.

FIGS. 1 and 2 are schematic drawings that are not drawn to scale for ease of understanding of the various embodiments of the invention.

DETAILED DESCRIPTION

Figure 1:
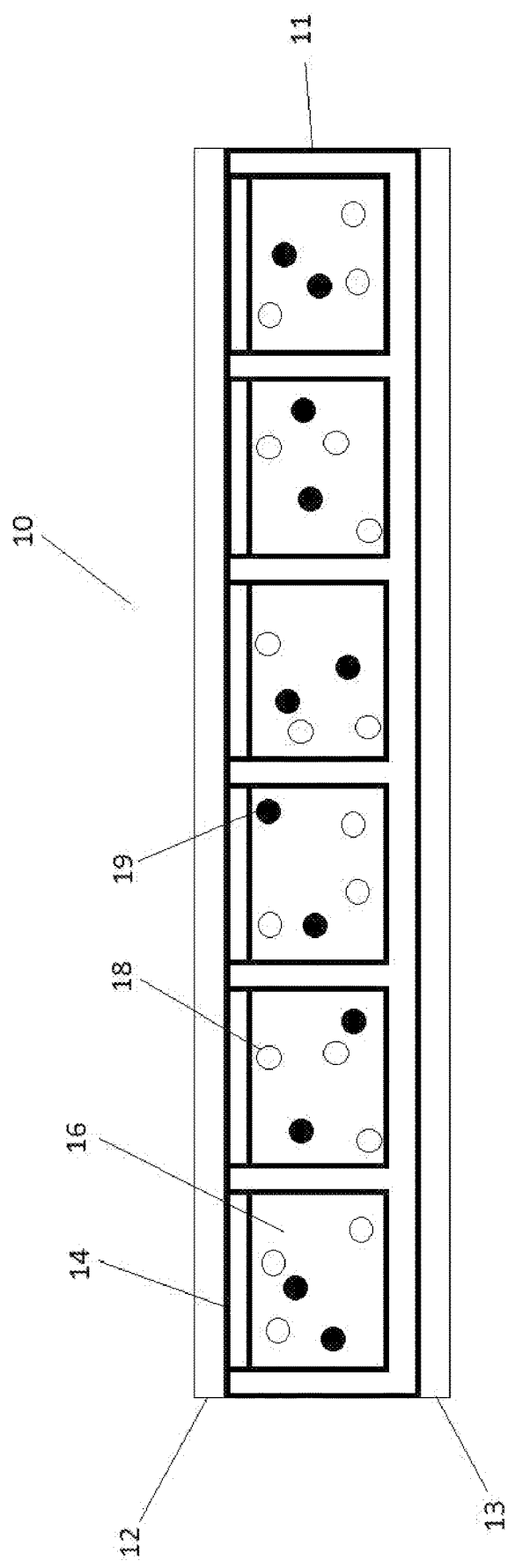
FIG. 1 is a side cross-sectional view of a quantum dot film according to a first embodiment of the present invention.

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention provide an improved quantum dot film by eliminating the polymer/quantum dot blends. The films according to various embodiments of the present invention encapsulate the quantum dot film in a plurality of sealed microcells. The dispersions of quantum dots may be encapsulated in optical films using various methods. For example, materials incorporated in display systems have been described in numerous patents and applications assigned to or in the names of the Massachusetts Institute of Technology (MIT), E Ink Corporation, E Ink California, LLC, and related companies. The various technologies use encapsulated and microcell electrophoretic and other electro-optic media. The technologies described in these patents and applications, the entireties of which are incorporated by reference herein, include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 6,672,921; 6,751,007; 6,753,067; 6,781,745; 6,788,452; 6,795,229; 6,806,995; 6,829,078; 6,833,177; 6,850,355; 6,865,012; 6,870,662; 6,885,495; 6,906,779; 6,930,818; 6,933,098; 6,947,202; 6,987,605; 7,046,228; 7,072,095; 7,079,303; 7,141,279; 7,156,945; 7,205,355; 7,233,429; 7,261,920; 7,271,947; 7,304,780; 7,307,778; 7,327,346; 7,347,957; 7,470,386; 7,504,050; 7,580,180; 7,715,087; 7,767,126; 7,880,958; 8,002,948; 8,154,790; 8,169,690; 8,441,432; 8,582,197; 8,891,156; 9,279,906; 9,291,872; and 9,388,307; and U.S. Patent Applications Publication Nos. 2003/0175480; 2003/0175481; 2003/0179437; 2003/0203101; 2013/0321744; 2014/0050814; 2015/0085345; 2016/0059442; 2016/0004136; and 2016/0059617;

(d) Methods for filling and sealing microcells; see for example U.S. Pat. Nos. 6,545,797; 6,751,008; 6,788,449; 6,831,770; 6,833,943; 6,859,302; 6,867,898; 6,914,714; 6,972,893; 7,005,468; 7,046,228; 7,052,571; 7,144,942; 7,166,182; 7,374,634; 7,385,751; 7,408,696; 7,522,332; 7,557,981; 7,560,004; 7,564,614; 7,572,491; 7,616,374; 7,684,108; 7,715,087; 7,715,088; 8,179,589; 8,361,356; 8,520,292; 8,625,188; 8,830,561; 9,081,250; and 9,346,987; and U.S. Patent Applications Publication Nos. 2002/0188053; 2004/0120024; 2004/0219306; 2006/0132897; 2006/0164715; 2006/0238489; 2007/0035497; 2007/0036919; 2007/0243332; 2015/0098124; and 2016/0109780;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Referring now to FIG. 1, a quantum dot film 10 according to a first embodiment of the present invention is illustrated. The quantum dot film 10 may comprise a layer of light-transmissive polymeric material 11 that has been embossed, for example, with a pattern of microcells. The pattern may provide a plurality of microcells in a variety of geometric configurations, e.g. round, oval, cubic, hexagonal, etc. Within each microcell is a preferably homogenous dispersion of quantum dots 18, 19 in a fluid solvent 16, preferably a liquid. The dispersions are sealed within the microcells with a light-transmissive sealing layer 14 that is preferably made from a curable material. The refractive index of the polymeric material 11, solvent 16, and sealing layer 14 are preferably closely matched.

The layer of polymeric material provided with the plurality of microcells, may include, but are not limited to, thermoplastic or thermoset materials or a precursor thereof, such as multifunctional vinyls including, but not limited to, acrylates, methacrylates, allyls, vinylbenzenes, vinylethers, multifunctional epoxides and oligomers or polymers thereof, and the like. Multifunctional acrylate and oligomers thereof are often used. A combination of a multifunctional epoxide and a multifunctional acrylate is also useful to achieve desirable physico-mechanical properties of the microcells. A low Tg (glass transition temperature) binder or crosslinkable oligomer imparting flexibility, such as urethane acrylate or polyester acrylate, may also be added to improve the flexure resistance of the film.

The layer of polymeric material comprising the plurality of microcells provides a flexible substrate, thereby enabling the use of various printing or coating techniques, some of which may be inexpensive, in order to fill the microcells with the dispersions containing quantum dots. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Furthermore, because the resulting quantum dot films may be flexible, the films may be incorporated in flexible displays.

The polymeric materials may also comprise a polar oligomeric or polymeric material. Such a polar oligomeric or polymeric material may be selected from the group consisting of oligomers or polymers having at least one of the groups such as nitro (—NO2), hydroxyl (—OH), carboxyl (—COO), alkoxy (—OR wherein R is an alkyl group), halo (e.g., fluoro, chloro, bromo or iodo), cyano (—CN), sulfonate (—SO3) and the like. The glass transition temperature of the polar polymer material is preferably below about 100° C. and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

Alternatively, the polymeric material may comprise (a) at least one difunctional UV curable component, (b) at least one photoinitiator, and (c) at least one mold release agent. Suitable difunctional components may have a molecular weight higher than about 200. Difunctional acrylates are preferred and difunctional acrylates having a urethane or ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acyl-phosphine oxide, 2-benzyl-2-(dimethylamino)-1-[4-(4-morpholinyl)phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1[4-(methylthio)phenyl]-2-morpholinopropan-1-one. Suitable mold release agents may include, but are not limited to, organomodified silicone copolymers such as silicone acrylates (e.g., Ebecryl 1360 or Ebecryl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

The preferred method of providing the polymeric material with microcells is by applying a pattern of microstructures on one surface of the polymeric material, such as the methods described in U.S. Pat. No. 6,930,818, the content of which is incorporated herein by reference in its entirety. For example, a drum having a three-dimensional pattern on its outer surface may be used to emboss a continuous sheet of polymeric material in a roll-to-roll process. The pattern on the surface of the drum may be in the form of a plurality of microposts, for example.

The quantum dot material in the dispersions may comprise one or more particulate material having one or more particle sizes. In a preferred embodiment of the present invention, the quantum dot material emit both green and red light when exposed to blue light. The quantum dot material may include, but is not limited to, CdSe core/shell luminescent nanocrystals, such as CdSe/ZnS, InP/ZnS, PbSe/PbS, CdSe/CdS, CdTe/CdS or CdTe/ZnS nanocrystals.

The quantum dot material is preferably provided in the form of nanoparticles having diameters substantially less than the wavelengths of visible light. The term "diameter" is used herein to include what is usually known as the "equivalent diameter" of a non-spherical particle. The nanoparticles used in the present invention need not be spherical or even essentially spherical. Variations in the properties of the nanoparticle displays can be achieved using non-spherical and composite particles, for example particles in which a core of one material is surrounded by a shell of a different material, and the present invention extends to nanoparticle displays and assemblies using such non-spherical and/or composite particles.

The non-spherical nanoparticles used in the present invention (which will typically be formed in whole or part from electrically conductive materials) may have a wide variety of shapes. For example, such particles may have the form of ellipsoids, which may have all three principal axes of differing lengths, or may be oblate or prolate ellipsoids of revolution. The non-spherical nanoparticles may alternatively be laminar in form, the term "laminar" being used herein in a broad sense to indicate bodies in which the maximum dimension along one axis is substantially less than the maximum dimension along each of the other two axes; thus, such laminar nanoparticles may have a form similar to the tabular silver halide grains well known in photographic films. The non-spherical nanoparticles may also have the form of frusta of pyramids or cones, or of elongate rods. Finally, the nanoparticles may be irregular in shape.

Composite (core/shell) nanoparticles used in the present invention may have any of the forms discussed in the preceding paragraph, and will typically comprise an electrically conductive shell around an insulating core, or an electrically insulating shell around a conductive core. An insulating core may be formed from, for example, silicon, titania, zinc oxide, aluminum silicates, various inorganic salts, or sulfur. Like the simple nanoparticles discussed above, the composite nanoparticles may be subjected to surface modification, for example to control the degree to which particles adhere to one another or to any surface with which they come into contact. One preferred type of surface modification is attachment of polymers to the surfaces of the nanoparticles.

As previously noted, one of the aspects of the various embodiments of the present invention is that the quantum dots may remain in the form of a dispersion when sealed in the microcells. The dispersion, as described herein, used to fill the microcells may preferably comprise, with increasing preference in the order given, not less than 0.01, 0.02, 0.04, 0.06, 0.08, 0.1, 0.2, 0.3, 0.4, 0.5% wt quantum dots and independently preferably is, with increasing preference in the order given, not more than, at least for economy, 0.6, 0.7, 0.8, 0.9, 1.0, 2.0, 3.0, 4.0, 5.0, 6.0, 7.0, 8.0, 9.0, 10% wt quantum dots.

The solvent may be a fluid, preferably a liquid that is clear and colorless, and more preferably a fluid with a refractive index that matches the refractive index of the light transmissive microcells and/or sealing layer. Examples of suitable solvents include hydrocarbons such as hexane, isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as chloroform, perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200).

The layer of sealing material for sealing the microcells may be applied using various techniques. For example, sealing may be accomplished by dispersing a thermoplastic or thermoset precursor in the dispersion fluid, wherein the thermoplastic or thermoset precursor is immiscible in the dispersion fluid and has a specific gravity lower than that of the display fluids. After filling the microcells with the precursor/dispersion mixture, the precursor phase separates from the dispersion and forms a supernatant layer which is then hardened or cured by solvent evaporation, interfacial reaction, moisture, heat or radiation. Specific examples of thermoplastics or thermosets and precursors thereof may include materials such as monofunctional acrylates, monofunctional methacrylates, multifunctional acrylates, multifunctional methacrylates, polyvinyl alcohol, polyacrylic acid, cellulose, gelatin or the like. Additives such as a polymeric binder or thickener, photoinitiator, catalyst, vulcanizer, filler, colorant or surfactant may be added to the sealing composition to improve the physico-mechanical properties and the optical properties of the display.

In another more preferably method, sealing may be accomplished by applying a sealing layer comprising an aqueous composition over the dispersion-filled microcells that is subsequently dried. In an aqueous composition, the sealing material may be an aqueous solution of a water soluble polymer. Examples of suitable water soluble polymers or water soluble polymer precursors may include, but are not limited to, polyvinyl alcohol; polyethylene glycol, its copolymers with polypropylene glycol, and its derivatives, such as PEG-PPG-PEG, PPG-PEG, PPG-PEG-PPG; poly(vinylpyrolidone) and its copolymers such as poly(vinylpyrolidone)/vinyl acetate (PVP/VA); polysaccharides such as cellulose and its derivatives, poly(glucosamine), dextran, guar gum, and starch; gelatin; melamine-formaldehyde; poly(acrylic acid), its salt forms, and its copolymers; poly(methacrylic acid), its salt forms, and its copolymers; poly(maleic acid), its salt forms, and its copolymers; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymer functionalized with quaternary ammonium groups, such as poly(2-methacryloxyethyltrimethylammonium bromide), poly(allylamine hydrochloride). The sealing material may also include a water dispersible polymer dispersed in water. Examples of suitable polymer water dispersions may include polyurethane water dispersions and latex water dispersions. Suitable latexes in the water dispersions include polyacrylate, polyvinyl acetate and its copolymers such as ethylene vinyl acetate, and polystyrene copolymers such as polystyrene butadiene and polystyrene/acrylate.

Referring again to FIG. 1, the quantum dot film 10 may optionally include a single or, more preferably, double release sheet 12, 13. The release sheets 12, 13 are preferably applied after the microcells are cured, filled, and sealed, such that the sheet of polymeric material is sandwiched between two adhesive layers, one or both of the adhesive layers being covered by a release sheet. By providing the polymeric sheets with one or more release sheets, the quantum dot film may be more easily used in a lamination process for assembling an electro-optic display.

Figure 2:
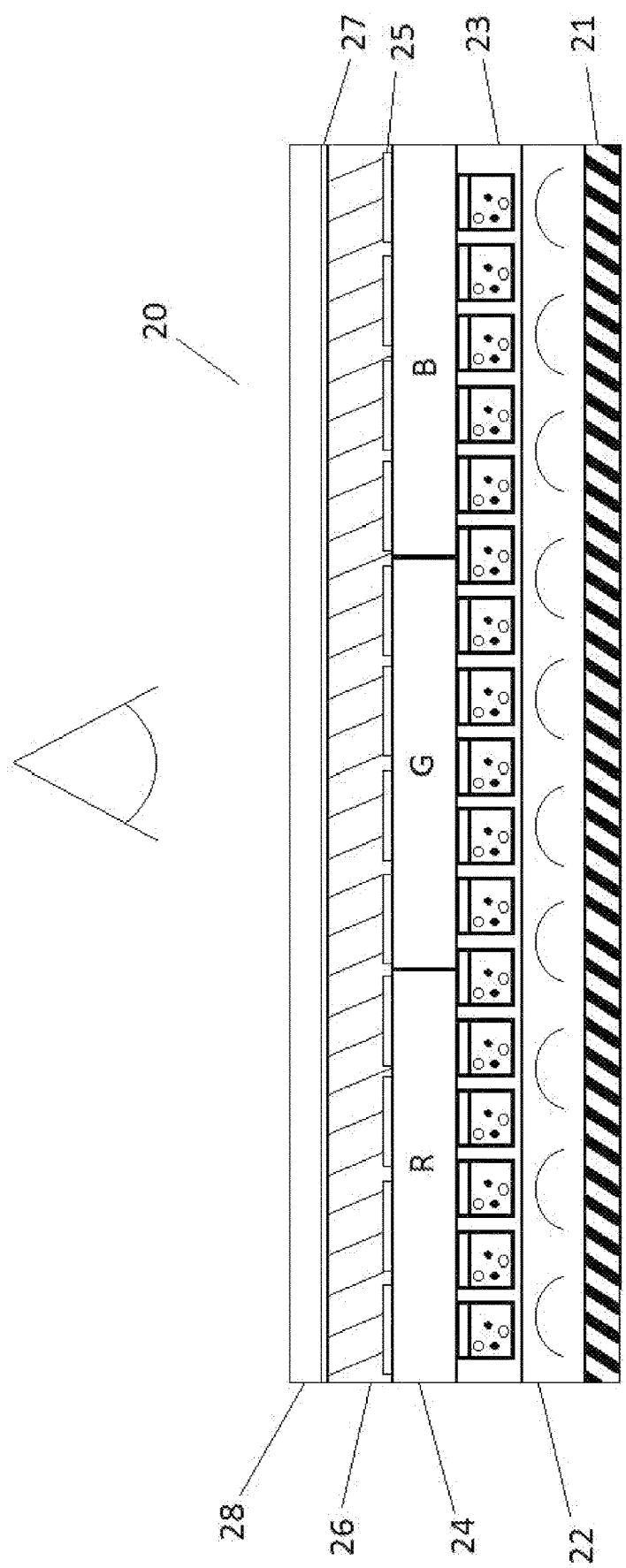
FIG. 2 is a side cross-sectional view of a display incorporating a quantum dot film according to an embodiment of the present invention.

For example, referring now to the embodiment of FIG. 2, an electro-optic display 20 may include a plurality of laminated layers, wherein one of the layers is a quantum dot film 23, as previously described. The quantum dot film 23 may be laminated between a back light unit 22 and a color filter 24. The back light unit 22 may optionally be laminated to a reflective substrate 21 in order to direct light through the quantum dot film 23. The back light unit 22 preferably includes one or more blue LEDs and a light-guide plate configured to evenly distribute the light across the display 20.

A layer of shuttering media 26 may be laminated to the color filter 24, such that the color filter 24 is between the quantum dot film 23 and the shuttering media 26. The shuttering media may include any electro-optic media that is capable of being switched between a generally light-missive state and an opaque state. Blue light emitted from the back light unit 22 will pass through the quantum dot film 23, which will convert a portion of the blue light to red and green light. The red, green, and blue light will enter the color filter 24 and filtered depending on the section of the color filter through which the filter passes. For example, the "R" portion will absorb the green and blue light, allowing the red light to pass, the "G" portion will absorb the red and blue light, allowing the green light to pass, and the "B" portion will absorb the red and green light, allowing the blue light to pass. The shuttering media above each section of the color filter 24 may be independently switched to allow a combination and/or selection of red, green, and blue light to pass and ultimately emitted by the display. Types of electro-optic media that may be used as a shuttering layer include, but are not limited to, liquid crystals, electro-chromic materials, and a di-electrophoretic dispersion.

In order to control the shuttering media, a series of light-transmissive electrodes 25 may be provided between the layer of shuttering media 26 and the color filter 24, and a continuous, light-transmissive front electrode 27 may be applied on the opposing side of the layer of shuttering media 26. The light-transmissive electrodes may be a thin metal or metal oxide layer of, for example, aluminum or ITO, or may be a conductive polymer. Finally, a light-transmissive protective layer 28 may be provided as an outer viewing surface of the display 20.

As would be appreciated by those of skill in the art, the embodiment illustrated in FIG. 2 may include more or less layers that those illustrated. For example additional adhesive layers may be incorporated between each of the layers. Alternatively, the color filter layer 24 and the plurality light-transmissive electrodes 25 may be combined into one layer, such that the electrodes are made from a light-transmissive colored conductive material. In yet another variation, the two electrode layers 25 and 27 may be reversed, such that the continuous electrode layer 27 is sandwiched between the shuttering layer 26 and the color filter 24 and the plurality of light-transmissive electrodes 25 is located adjacent the front protective layer 28.

All of the contents of the publications disclosed above are incorporated by reference herein.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

I claim:

1. A quantum dot film comprising a plurality of sealed microcells, the microcells being formed within a layer of polymeric material and sealed with a sealing material, and the microcells containing a dispersion comprising a solvent and a plurality of quantum dots,
   wherein the sealing material is selected from the group consisting of monofunctional acrylates; monofunctional methacrylates; multifunctional acrylates; multifunctional methacrylates; polyvinyl alcohol; polyacrylic acid; gelatin; polyethylene glycol, copolymers of polyethylene glycol and polypropylene glycol, and derivatives thereof; poly(vinylpyrolidone) and copolymers thereof; polysaccharides and derivatives thereof; melamine-formaldehyde; poly(acrylic acid) and salt forms and copolymers thereof; poly(methacrylic acid) and salt forms and copolymers thereof; poly(maleic acid) and salt forms and copolymers thereof; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymers functionalized with quaternary ammonium groups; polyurethane water dispersions; and latex water dispersions.

2. The quantum dot film of claim 1, wherein the polymeric material is selected from the group consisting of a thermoplastic and a thermoset.

3. The quantum dot film of claim 1, wherein the sealing material is light transmissive.

4. The quantum dot film of claim 1, wherein the solvent comprises a liquid.

5. The quantum dot film of claim 1, wherein the dispersion comprises 0.01 to 10% wt. quantum dots.

6. The quantum dot film of claim 1, wherein the quantum dots comprise nanocrystals selected from the group consisting of CdSe/ZnS, InP/ZnS, PbSe/PbS, CdSe/CdS, CdTe/CdS and CdTe/ZnS.

7. An electro-optic display comprising a quantum dot film according to claim 1.

8. The electro-optic display of claim 7 further comprising a light-emitting layer and a color filter layer, wherein the quantum dot film is disposed between the light-emitting layer and the color filter layer.

9. The electro-optic display of claim 8, further comprising a layer of shuttering media selected from the group consisting of liquid crystal, a di-electrophoretic dispersion, and electrochromic material.

10. A method of making a quantum dot film comprising:
providing a layer of polymeric material having a plurality of open microcells;
filling the plurality of open microcells with a dispersion comprising a solvent and plurality of quantum dots; and
sealing the microcells,
wherein the sealing material is selected from the group consisting of monofunctional acrylates; monofunctional methacrylates; multifunctional acrylates; multifunctional methacrylates; polyvinyl alcohol; polyacrylic acid; gelatin; polyethylene glycol, copolymers of polyethylene glycol and polypropylene glycol, and derivatives thereof; poly(vinylpyrolidone) and copolymers thereof; polysaccharides and derivatives thereof; melamine-formaldehyde; poly(acrylic acid) and salt forms and copolymers thereof; poly(methacrylic acid) and salt forms and copolymers thereof; poly(maleic acid) and salt forms and copolymers thereof; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymers functionalized with quaternary ammonium groups; polyurethane water dispersions; and latex water dispersions.

11. The method of claim 10, wherein the providing step comprises embossing the plurality of open microcells into the layer of polymeric material.

12. The method of claim 10, wherein the dispersion further comprises a curable compound and the sealing step comprises curing the curable compound to form a sealing layer and contain the solvent and plurality of quantum dots within the sealed microcells.

13. A quantum dot film comprising a plurality of sealed microcells, the microcells being formed within a layer of polymeric material and sealed with a sealing material, and the microcells containing a dispersion comprising a solvent and a plurality of quantum dots,
wherein the quantum dots comprise nanocrystals selected from the group consisting of CdSe/ZnS, InP/ZnS, PbSe/PbS, CdSe/CdS, CdTe/CdS and CdTe/ZnS.

14. The quantum dot film of claim 13, wherein the polymeric material is selected from the group consisting of a thermoplastic and a thermoset.

15. The quantum dot film of claim 13, wherein the sealing material is selected from the group consisting of monofunctional acrylates; monofunctional methacrylates; multifunctional acrylates; multifunctional methacrylates; polyvinyl alcohol; polyacrylic acid; gelatin; polyethylene glycol, copolymers of polyethylene glycol and polypropylene glycol, and derivatives thereof; poly(vinylpyrolidone) and copolymers thereof; polysaccharides and derivatives thereof; melamine-formaldehyde; poly(acrylic acid) and salt forms and copolymers thereof; poly(methacrylic acid) and salt forms and copolymers thereof; poly(maleic acid) and salt forms and copolymers thereof; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymers functionalized with quaternary ammonium groups; polyurethane water dispersions; and latex water dispersions.

16. The quantum dot film of claim 15, wherein the sealing material is light transmissive.

17. The quantum dot film of claim 13, wherein the solvent comprises a liquid.

18. The quantum dot film of claim 13, wherein the dispersion comprises 0.01 to 10% wt. quantum dots.

19. An electro-optic display comprising a quantum dot film according to claim 13.

20. The electro-optic display of claim 19 further comprising a light-emitting layer and a color filter layer, wherein the quantum dot film is disposed between the light-emitting layer and the color filter layer.

21. The electro-optic display of claim 20, further comprising a layer of shuttering media selected from the group consisting of liquid crystal, a di-electrophoretic dispersion, and electrochromic material.

22. A method of making a quantum dot film comprising:
providing a layer of polymeric material having a plurality of open microcells;
filling the plurality of open microcells with a dispersion comprising a solvent and plurality of quantum dots; and
sealing the microcells,
wherein the quantum dots comprise nanocrystals selected from the group consisting of CdSe/ZnS, InP/ZnS, PbSe/PbS, CdSe/CdS, CdTe/CdS and CdTe/ZnS.

23. The method of claim 22, wherein the providing step comprises embossing the plurality of open microcells into the layer of polymeric material.

24. The method of claim 22, wherein the dispersion further comprises a curable compound and the sealing step comprises curing the curable compound to form a sealing layer and contain the solvent and plurality of quantum dots within the sealed microcells.

* * * * *